Dec. 25, 1956  A. A. ASHTON  2,775,429
DRAWWORKS HAVING SELECTIVE TRANSMISSION AND CONTROL
Filed March 26, 1951  4 Sheets-Sheet 1
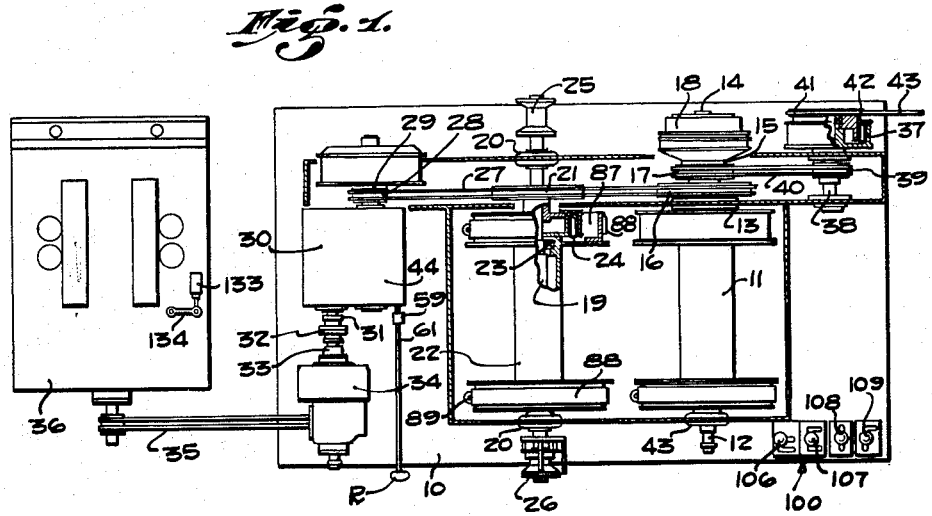
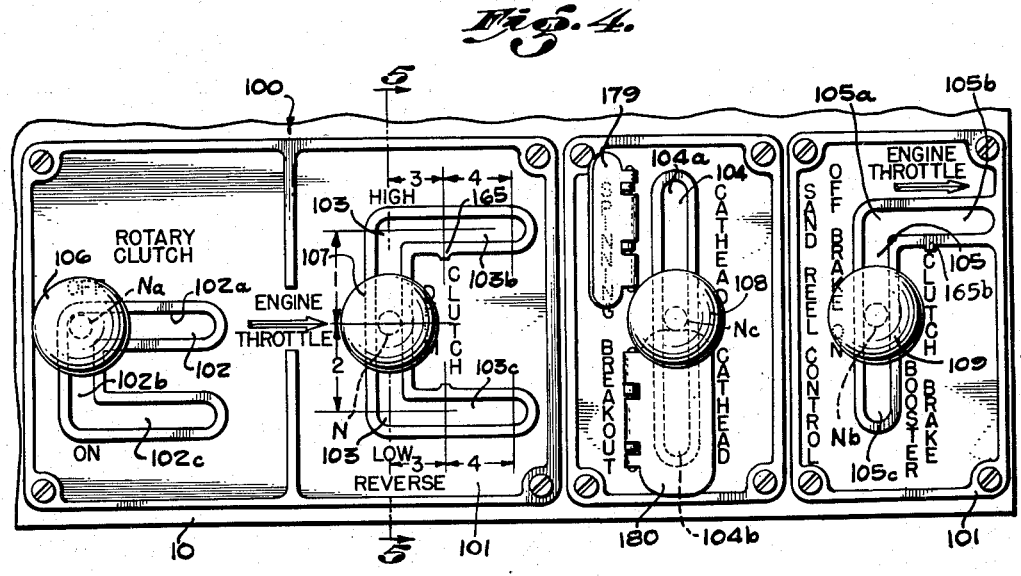
INVENTOR.
ALBERT A. ASHTON,
BY
ATTORNEY

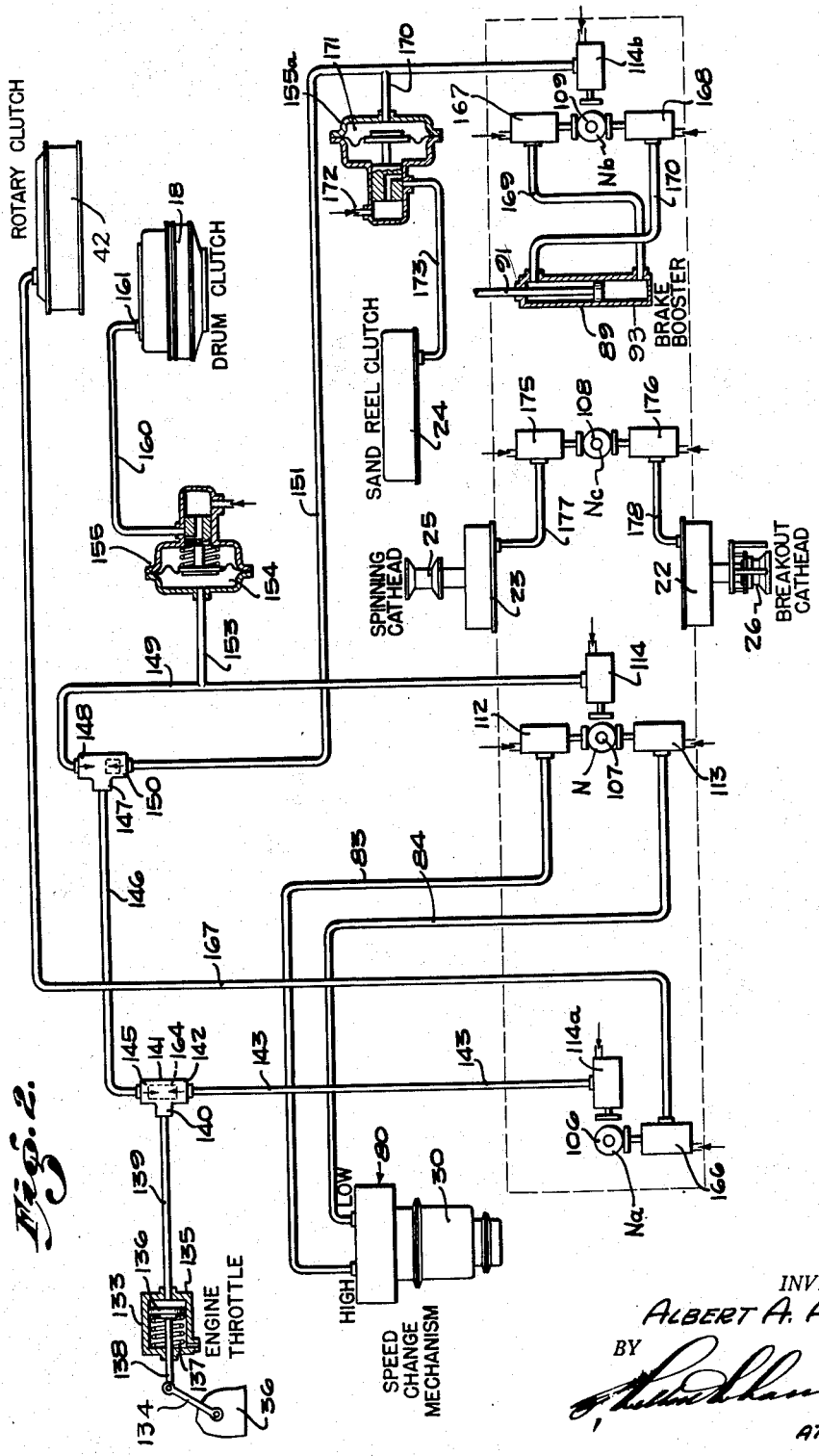

Dec. 25, 1956  A. A. ASHTON  2,775,429
DRAWWORKS HAVING SELECTIVE TRANSMISSION AND CONTROL
Filed March 26, 1951  4 Sheets-Sheet 3
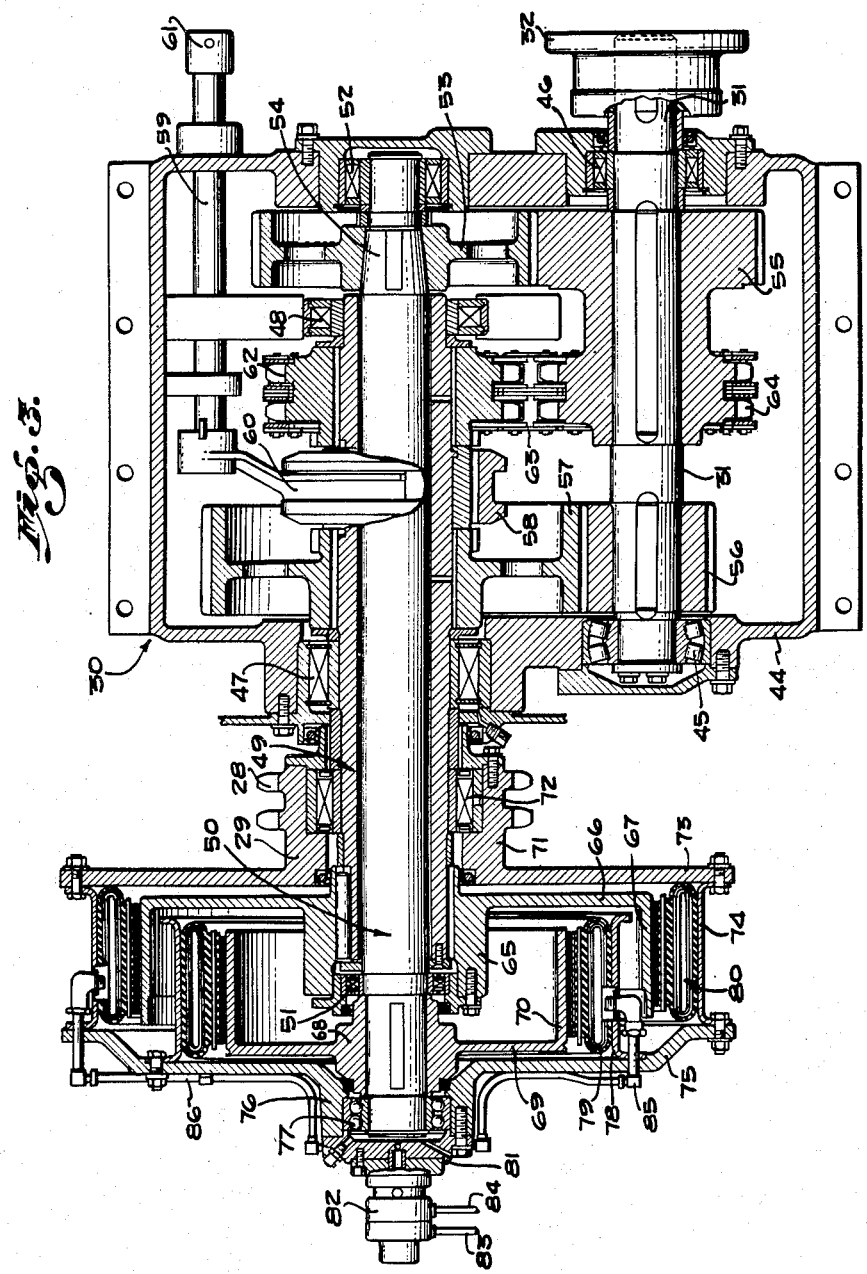
Fig. 3.
INVENTOR.
ALBERT A. ASHTON,
BY
ATTORNEY Dec. 25, 1956  A. A. ASHTON  2,775,429
DRAWWORKS HAVING SELECTIVE TRANSMISSION AND CONTROL
Filed March 26, 1951  4 Sheets-Sheet 4
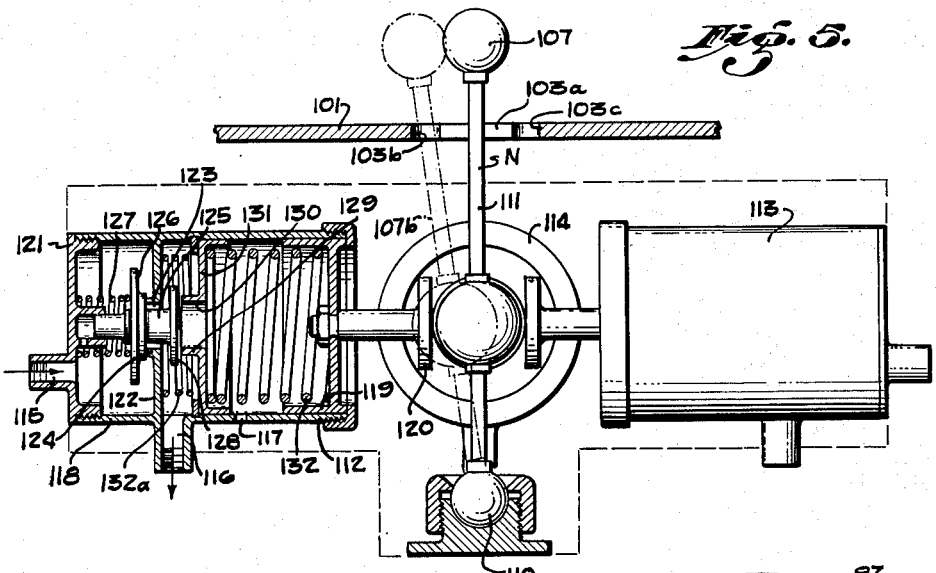
INVENTOR.
ALBERT A. ASHTON,
BY
ATTORNEY United States Patent Office 2,775,429
Patented Dec. 25, 1956

2,775,429

DRAWWORKS HAVING SELECTIVE TRANSMISSION AND CONTROL

Albert A. Ashton, Houston, Tex., assignor to Emsco Manufacturing Company, a corporation of California Application March 26, 1951, Serial No. 217,530

6 Claims. (Cl. 255—19)

My invention relates to rotary well drilling equipment and relates in particular to a drawworks of simple form having improved controls for the operative parts of the drawworks contributing to greater ease of control and maximum safety in the operation of the equipment because of the manner in which the controls are correlated.

It is an object of the invention to provide a drawworks having controls equipped with manually operated control levers, all situated in a console in front of the driller, this making it possible for him to observe adjustment of all of the controls without having to divert his attention from the operations carried on within the derrick, and also making it possible for him to operate the various controls without leaving or reaching away from the driller's station adjacent the front of the drawworks.

It is an object of the invention to provide a simplified drawworks having an improved air operated reversing and variable speed mechanism, and a torque converter which receives power from a power source such as an internal combustion engine, this power being delivered to the speed change and reversing mechanism having an output shaft member which is connected through air actuated friction clutches with drivable parts of the drawworks.

A further object of the invention is to provide a drawworks having a drum on which cable may be wound, there being only one drive, such as a chain, directly connected to the drum through a single air actuated friction clutch.

A further object of the invention is to provide for driving of the drum of the drawworks, a speed change mechanism and air actuated friction clutch disposed in series between the power source and the drum and a simple means whereby a single lever may be employed to selectively bring either the high speed connection or the low speed connection of the speed change gear into operation and then actuate the friction clutch, thereby completing the drive connection between the power source and the drum.

A further object of the invention is to provide means whereby the single control lever of the preceding paragraph also exercises control over the operation of the power source. In the preferred practice of the invention an initial movement of the control lever effects an adjustment of the speed change mechanism, a further movement actuates the friction clutch and a still further movement actuates the fuel control of the internal combustion engine so as to control the power production of the power delivery means connected to the drawworks.

A further object of the invention is to provide means for driving another rotatable part of the drawworks, such as a sand reel, and a control for the operation of the means which delivers power to the sand reel, this control also employing a single lever which is manually movable through a number of established paths of movement and has a movement which accomplishes control of the power delivery means. This control is used in conjunction with the operation of the rotary machine drive connection of the drawworks and/or the driving means of the sand reel.

A further object of the invention is to provide a drawworks having a novel sand reel brake and control therefor, operating in conjunction with the means for delivering power to the sand reel for its operation.

A further object of the invention is to provide a control for a rotary drawworks which is completely air operated through use of valves actuated by a number of control levers, the device having a simple arrangement whereby a plurality of control levers individually effect regulation of a single throttle operating motor or controlling the supply of fuel to the engine so as to vary the delivery of power to the drawworks.

It is a further object of the invention to provide a drawworks having a simple speed change mechanism therein adapted for actuation by fluid, such as air, this speed change mechanism being characterized by an arrangement of friction clutches therein so that change of the adjustment of the mechanism from one speed to the other involves no danger of injury to any part of the drawworks.

It is a further object of the invention to provide a drawworks having air actuated catheads and a simple means for controlling these catheads individually so that when one of the catheads is being operated there is no danger of inadvertent and hazardous operation of the other cathead.

Further objects and advantages of the invention will be brought out in the following part of the specification wherein I have described a preferred embodiment of the invention in detail for the purpose of completeness of disclosure, without intent by the description of these details to limit the scope of the invention set forth in the accompanying claims nor restrict the range of equivalents to which the claims are entitled.

Referring to the drawings which are for illustrative purposes only:

Fig. 1 is a schematic plan view showing a drawworks embodying the invention;

Fig. 2 is a diagram of the control system forming a part of the present invention;

Fig. 3 is a sectional view, to enlarged scale, showing the speed change mechanism forming a part of the invention;

Fig. 4 is a face view of the cover plate or control panel of the control console of the drawworks;

Fig. 5 is a schematic sectional view showing one of the air control valves employed in the invention;

Fig. 6 is a fragmentary sectional view of a relay valve employed in the practice of the invention; and Fig. 7 is a sectional view showing one of the brake members used in the invention.

As shown in Fig. 1, the drawworks of my invention is supported upon a base 10 and includes a cable drum 11 fixed on a shaft 12 which is supported by bearings 13. On the far end 14 of the shaft 12 a quill 15 is rotatably supported, this quill having thereon a large sprocket 16 and a smaller sprocket 17. An air actuated clutch 18 of the friction type is arranged upon the far end 14 of the shaft 12 and is adapted to connect the quill 15 and the shaft 12, so that rotation of the quill will be transmitted to the cable drum 11.

A shaft 19 is rotatably supported by bearings 20 in a position upwardly and rearwardly from the drum 11. This shaft 19 has a sprocket 21 fixed thereon in alignment with the sprocket 16. A sand reel 22 is rotatably supported on the shaft 19 by bearings one of which is shown at 23 and an air actuated friction clutch 24 is disposed between the shaft 19 and one end of the sand reel 22. Air actuated catheads 25 and 26 are mounted on the opposite ends of the shaft 19, one of these catheads being a spinning cathead and the other being a breakout cathead.

The sprockets 16 and 21 are arranged to be driven by chain 27 which extends over these sprockets 16 and 21 and over a sprocket 28 which is mounted upon a rotatable part 29 of a speed change mechanism 30. At the end of the speed change mechanism, opposite to the rotatable part 29, there is a second rotatable part 31 which is connected by a coupling 32 to the output shaft 33 of a torque converter 34. This torque converter 34 is adapted to be driven through a chain 35 by a power delivery means shown as an internal combustion engine 36.

At the front end of the drawworks there is a rotary machine drive 37 comprising a jack shaft 38 on which a sprocket 39 is fixed, this sprocket 39 being stationed so that it may be driven by chains 40 from the sprocket 17 carried by the quill 15. A rotary drive sprocket 41 is rotatably supported upon the shaft 38, and between the sprocket 41 and the shaft 38 there is an air actuated friction clutch 42. When the shaft 38 is driven, actuation of the clutch 42 will produce rotation of the sprocket 41 so as to drive a chain 43 which extends to the sprocket of the rotary machine, not shown.

The speed change mechanism 30 includes a casing 44 which carries bearings 45 and 46 to support the rotatable part 31, which is shown as a shaft. The casing 44 also has bearings 47 and 48 which support the hollow shaft 49 in parallel relation to the shaft 31. A solid shaft 50 projects through the hollow shaft 49 and is supported for rotation by a bearing 51 supported at the far end of the hollow shaft 49 and a bearing 52 supported by the casing 44 in spaced relation to the near end of the hollow shaft 49. A drive connection is formed between the shaft 31 and the shaft 50 by a gear 53 which is fixed on the projecting end 54 of the shaft 50 and a gear 55 which is fixed on the shaft 31. A drive connection is formed between the shaft 31 and the hollow shaft 49 by a pinion 56 fixed on the shaft 31 and a gear 57 turnably mounted on the sleeve or hollow shaft 49 and being adapted for driving connection with the hollow shaft 49 by a clutch member 58. For movement of the clutch member 58 a bar 59 is supported in the casing 44 in parallel relation to the axis of the hollow shaft 49 and a shifting yoke 60 is extended from the bar to the clutch member 58. Movement is transmitted to the bar by means of a a linkage 61, Fig. 1, which connects the outer end of the bar 59 with a control knob R disposed on the exterior of the drawworks housing for operation by the driller when he requires reverse rotation of any of the mechanisms driven by the speed change mechanism 30.

A sprocket 62 is turnably mounted on the near end of the hollow shaft 49 and on the shaft 31 there is a sprocket 64 which is connected to the sprocket 62 by a chain 63. The clutch member 58 is arranged between the gear 57 and the sprocket 62, and is splined on the hollow shaft 49 so that it will rotate therewith. This clutch member 58 is adapted to make clutching engagement with either the gear 57 or the sprocket 62 depending upon the direction in which it is shifted. If the clutch member 58 is shifted toward the gear 57 so as to clutch the gear 57 to the sleeve 49, the sleeve will be rotated in the same direction as the shaft 50, but at slower speed. When the clutch member 58 is moved in the opposite direction so as to clutch the sprocket 62 to the sleeve 49, the sleeve 49 will be rotated in a direction opposite to the rotation of the shaft 50.

A hub 65 fixed on the outer end of the sleeve 49, carries a radial wall 66 which supports a clutch drum 67 in a position surrounding the hub 65. A hub 68, fixed on the outer end of the shaft 50, carries a radial wall 69 which supports a clutch drum 70 in a position within the drum 67. The rotatable member 29 comprises a hub portion 71 supported for rotation on a projecting portion of the sleeve 49 by a bearing 72, a radial wall 73 which projects from the hub 71, a cylindric wall 74 projecting from the periphery of the wall 73 across the face of the drum 67 and an end plate 75 having a hub portion 76 supported on the extreme end of the shaft 50 by a bearing 77. A cylindric wall 78 is mounted on the inner face of the end plate 75 so as to surround the clutch drum 70 in spaced relation thereto, and on the inner face of this cylindrical wall 78 a tubular, air expanded clutch member 79 is mounted. A tubular, air expanded clutch member 80 is mounted on the inner face of the cylindric wall 74, for engagement with the clutch drum 67. A plate 81, secured to the face of the hub 76 supports a swivel connection 82 for connecting air ducts 83 and 84 with air ducts 85 and 86 carried by the rotatable member 29 and being respectively connected to the expansible tubular clutch members 79 and 80.

The sand reel 22 is equipped with brake means including brake drums 87, brake bands 88 and brake actuating means 89, details of which are shown in Fig. 7. A fitting 90 at the live end of the brake band 88 is connected to a rod 91 arranged to extend into a guide barrel 92 of the actuating means 89. This barrel 92 projects from a double acting air cylinder 93 which is secured to a stationary member 94 in the drawworks. The inner end of the rod 91 is connected to a piston P which occupies an intermediate position within the cylinder 93, when the brake band 88 is applied to the brake drum 87. The rod 91 has a collar 95 thereon positioned so that it will be spaced a short distance from the upper end of the cylinder 93 when the brake is applied. A heavy compression spring 96 is seated against a shoulder 97 disposed at the upper end of the guide barrel 92, and its lower end bears against the collar 95 so as to urge the rod 91 downwardly and thereby constrict the brake band 88 tightly against the drum 87. At the lower end of the cylinder 93 there is a fluid inlet 98 for introduction of fluid under pressure into the lower end of the cylinder 93 so that the pressure thereof will act against the lower face of the piston P and move the piston and the rod 91 upwardly against the force of the spring 96, thereby releasing the brake band 88. When fluid pressure is released from the lower end of the cylinder 93, the spring 96 will actuate the brake band 88 into engagement with the drum 87. A fluid inlet 99 is provided for introduction of fluid, such as air, into the upper end of the cylinder 93 for the purpose of applying to the rod 91 a downward force which will supplement the force of the spring 96 in the actuation of the brake under emergency conditions.

At the front end of the drawworks there is a console 100 having a face plate 101 disposed at about waist height of a driller standing upon the floor adjacent thereto. As shown in Fig. 4, the face plate 101 has guides consisting of slots 102, 103, 104 and 105 respectively for control members 106, 107, 108 and 109 which are shown in their neutral positions in Fig. 4. Each of these control members 106–109 comprises a lever. Fig. 5, which shows the control member 107, is illustrative of the manner in which the control members may be supported for movement. The control member 107 comprises a lever pivoted at its lower end by means of a ball and socket joint 110. The member 107 has a portion 111 which projects through the slot 103 which defines paths of movement in which the member 107 may be moved from the neutral position 112 in which it is shown in Fig. 5 to an operating position such as shown in Fig. 5 by dotted lines 107b. The slot 103 is in the shape of a simplified letter C, as shown in Fig. 4, and defines a plurality of paths of movement. From the neutral position 112, the control member 107 may be moved through a path of movement 1 to the far end of the slot 103. It may be moved through a path of movement 2 to the near end of the slot 103. It may be moved rightwardly (laterally) from the ends of the paths of movement 1 and 2 through paths of movement 3 in either of the lateral portions 103b or 103c of the slot 103 and, from the paths 3 the control member 107 may be moved in paths 4 extending rightwardly in the portions 103b and 103c of the slot 103. As shown in Figs. 2 and 5 air valves 112 and 113 are arranged within the console so as to be actuated respectively when the control member is moved from the neutral position 112 in the paths 1 and 2, and the valve 114 is arranged in a position at right angles to the valves 112 and 113 and wherein it will be actuated when the control member is moved in either of the paths 3 and 4. Valve 112, Fig. 5, is illustrative of the construction of the valves 113 and 114. These valves are of three-way type, having an inlet 115 adapted to receive air under pressure from a source of air pressure such as a tank (not shown), a pressure outlet 116 adapted to be connected to a device which is to be actuated by air pressure and an exhaust port 117 through which air from the outlet 116 may be exhausted to the exterior, thereby relieving the fluid pressure in the device which is connected to the outlet 116. The valve 112 has a body 118 of cylindric form in which a first piston 119 is slidable, this piston having a projection 120 adapted to be engaged by the control member 107 when it is moved in the first path 1 defined by the slot 103. In the end of the housing 118 opposite from the piston 119 there is a head 121 and spaced from this head 121 within the housing 118 there is a dividing wall having a central opening 123 defined by an annular lip 124. A shiftable valve member 125 extends through the opening 123. This valve 125 has on one end thereof an annular closure 126 arranged to engage the lip 124 when a spring 127 urges the valve member 125 away from the end member 121, thereby preventing flow of air from the inlet 115 through the opening 123 to the outlet 116.

At the opposite end of the shiftable member 125 there is an annular closure 128 positioned so as to cooperate with the annular lip 129 which defines an opening 130 in a piston member positioned in the housing 118 between the outlet 116 and the exhaust port 117. A relatively heavy compression spring 132 is disposed between the piston members 119 and 131; a lighter spring 132a is disposed between the piston member 131 and the wall 122 for holding the piston member 131 against the adjacent end of the spring 132. When the piston member 119 is not forced inwardly by movement of the control member 107, the lip 129 of the piston member 131 will be spaced from the annular closure 128 so that air from the outlet 116 may flow through the opening 130 to the exhaust port 117. When the control member 107 is moved from the neutral position N toward the position in which it is shown in dotted lines 107b, the piston member 119 will be shifted toward the piston member 131, compressing the spring 132 and shifting the piston member 131 in a direction to bring the annular lip 129 thereof into engagement with the annular closure 128, thereby shutting off communication between the outlet 116 and the exhaust port 117. Further movement of the piston member 119 in leftward direction will be then transmitted through the piston member 131 to the shiftable valve member 125, moving the same leftwardly so as to disengage the annular closure 126 from the annular lip 124 and permit air under pressure from the inlet 115, to flow through the opening 123 of the wall 122 to the outlet 116. As pressure builds up in the outlet 116, such pressure will be exerted rightwardly against the piston member 131 to move the same against the force of the spring 132. This rightward movement of the piston member 131 will permit the shiftable member 125 to move rightwardly so that when the force exerted rightwardly against the piston member 131 substantially equals the leftward force exerted by the spring 132, the annular closure member 126 will engage the annular lip 124 and shut off further passage of air through the opening 123 from the inlet 115 into the space between the wall 122 and the piston member 131. Accordingly, the degree to which the piston member 119 is moved leftwardly determines the pressure of air in the outlet 116 of the valve 125 and in the air actuated mechanism to which this outlet 116 is connected.

As shown in Fig. 2, the outlets of valves 112 and 113 are connected respectively to the ducts 83 and 84 leading to the speed change mechanism 30. As further shown in Fig. 2, the service outlet of the valve 114 is connected with an air actuated throttle control 133 arranged to move the fuel control lever 134 of the engine 36. The throttle control 133 comprises a cylinder 135 having a piston 136 therein which is moved toward low-power position by a spring 137. This piston 136 is connected to the lever 134 by a piston rod 138, and when air pressure is fed into the cylinder 135 through a delivery duct 139, the piston 136 will be moved against the force of the spring 137, thereby swinging the fuel control 134 and increasing the power output of the engine 36.

The duct 139 is connected to the outlet port 140 of a two-way check valve 141 which has its inlet port 142 connected by a duct 143 with a valve 114a of the same construction as the valve 112. The inlet port 145 of the double check valve 141 is connected by a duct 146 with the outlet port of a double check valve 147. The inlet port 148 of the double check valve 147 is connected through a duct 148 with the service outlet of the valve 114, and the second inlet port 150 of the check valve 147 is connected through a duct 151 with a valve 114b. A branch duct 153 leads from the duct 149 to the diaphragm chamber 154 of a three way relay valve 155.

As shown in Fig. 6, this relay valve 155 has a pressure inlet port 156 adapted to be connected to the source of air under pressure, a service port 157 for connection to a device which is to be actuated by air pressure, an exhaust port 158 which connects the port 157 with atmosphere by way of a bleed port 158' when a valve plunger 159 of the device is in retracted position, as shown in Fig. 6 and a valve port 156' between the ports 156 and 157 which is at this time closed by a plunger 159' which is connected to the plunger 159. As shown in Fig. 2, the service port 157 of the valve 155 is connected by a duct 160 with the air inlet 161 of the air actuated drum clutch 18. When the diaphragm 162 of the valve 155 is moved by air pressure in the chamber 154, the valve plunger 159 will be shifted so as to cut off the exhaust port 158 and the plunger 159' will be shifted leftwardly so as to open the valve port 156' and connect the service outlet 157 with the pressure inlet 156, thereby delivering air under pressure to the drum clutch 18 and clutch the sprocket 16 to the shaft 12 so that the drum 11 will be driven. The relay valve 155 has a spring 163 which is of such strength that an air pressure of 15 lbs. will be required in the chamber 154 to accomplish an actuation of the valve 155 so as to connect the pressure inlet port 156 with the service port 157. The spring 137 of the throttle control 133 is of such strength that the piston 136 cannot be moved by a pressure less than 15 lbs. The two way check valves 145 and 147 each has therein a shiftable closure 164 arranged to be shifted by air which enters one of the air inlets so as to close off the other of the air inlets and prevent escape of air under pressure through such other air inlets.

The operation of the control which may be exercised by the control member 107 is as follows. Movement of the member 107 from the neutral position N in the path 1 will actuate the valve 112 so as to deliver air under pressure to the high speed clutch member 79 in change speed mechanism 30 (Fig. 3), with the result that the sprocket 28 of the speed change mechanism 30 will be driven at relatively high speed, and likewise the sprockets 16 and 21 will be driven at relatively high speeds. Then, lateral movement of the control member 107 in the path 3 comprising the first portion of the lateral part 103b of the slot 103 will actuate the valve 114 so as to deilver air at relatively low pressure into the duct 149, Fig. 2. When the rightward end of the path 3 is reached, as indicated by an indicator 165, the pressure in ducts 139, 146, 149 and 153 will have reached 15 lbs. to actuate the relay valve 155 so that air pressure will be delivered through duct 160 to the air actuated drum clutch 18, but the throttle control 133 will not be actuated at this time since a pressure greater than 15 lbs. per square inch is required to move the piston 136 against the spring 137. Therefore, if the operator desires to increase the power delivered by the engine he moves the control member 107 in the slot portion 103b rightwardly in the path 4 increasing the actuation of the valve 114 so as to gradually increase the pressure transmitted through duct 149, duct 146 and duct 139 to the cylinder 135 of the throttle control 133. If the operator desires slow speed operation of the drum 11 he may move the control member 107 from the neutral position N in the path 2 so as to actuate valve 13 and deliver air under pressure through duct 84 to the low speed clutch member 80 of the speed change transmission 30. He may then move the control member 107 rightwardly in the portion 103c of the slot 103 so that it will first pass through the third path 3 and then into the fourth path of the slot portion 103c, to actuate the drum clutch 18 and then actuate the throttle control 133 as the result of actuation of the valve 114 which results from rightward lateral movement of the control member 107.

The valves 114a and 114b are disposed in the same relation to the control members 106 and 109, as the relation of the valve 114 to the control member 107, so that whenever either of the control members 106 or 109 is moved rightwardly air under pressure will be fed to the throttle control 133. The control member 106 is for control of the clutch 42 associated with the rotary drive sprocket 41 and for control of the engine throttle. As shown in Fig. 4, the slot 102 of the plate 101 which defines the movement of the control member 106 has a portion 102a leading rightwardly from the neutral position Na, a portion 102b leading toward an operator who stands in front of the console 100 and a portion 102c which leads rightwardly from the near end of the portion 102b. As shown in Fig. 2, a valve 166 is positioned so that it will be actuated by the control member 106 when it is moved from the neutral position Na in and through the path 102b. The service outlet of this valve 166 is connected by duct 167' with the clutch member 42 of the rotary machine drive 37. When the operator desires to actuate the rotary drive 37, he may first move the control member 107 to the end of either path 1 or path 2, Fig. 4, thereby actuating the speed change of transmission 30. Then, to engage the clutch 42 of the rotary drive 37 he may move the control member 106 from the neutral position Na through the path defined by the slot portion 102b to actuate the valve 166. Then, he may increase the power delivery of the engine 36 by moving the control member 106 rightwardy in the second path of movement defined by the portion 102c of the slot 102. The purpose of the portion 102a of the slot 102 is to enable the operator to actuate the engine throttle at any time. For example, should he desire to increase the feeding of fuel to the engine 36 during a warm up period he may move the control member 106 rightwardly from the neutral position Na in the path of movement defined by the slot portion 102a, thereby speeding graduated air pressure through the duct 143, the two way check valve 141 and the duct 139 to the cylinder 135 of the throttle control 133.

As shown in Fig. 4, the control member 109 may be moved in the slot 105 from a neutral position Nb through a slot portion 105a which communicates with a slot portion 105b which extends laterally. He may move the control member 109 also in the portion 105c of the slot 105. Air valves 167 and 168 are disposed on opposite sides of the neutral position Nb and in a plane disposed at right angles to the axis of the valve 114b, so that when the control member 109 is moved in the first and second paths of movement represented by the slot portion 105a and 105c, the valves 167 and 168 would be respectively actuated. The service outlets of these valves 167 and 168 are connected respectively through ducts 169 and 170 with the air inlets 98 and 99 of the cylinder 93, Fig. 7. The duct 151 is connected by a branch duct 170 which leads to the air chamber 171 of a valve 155a, of the same type as the valve 155 shown in Fig. 6. This valve 155a acts in response to a pressure not greater than 15 lbs. to connect an air pressure pipe 172 with the expansible air actuated clutch element 24 of the sand reel 22, through a duct 173 indicated in Fig. 2. The operation of the sand reel is as follows: By movement of the control member 109 from the neutral position Nb in the first path of movement represented by the slot portion 105a, the operator may actuate valve 167 so as to deliver air through the duct 169 and the air inlet 98, Fig. 7, to apply air pressure to the lower end of the piston P, thereby moving the rod 91 against the force of the spring 96 to release the sand reel brake band 88. If two brake bands are employed in conjunction with the sand reel, as shown in Fig. 1, actuation of the valve 167 will supply air pressure to the brake releasing mechanism associated with both of the brakes of the sand reel. Then, the operator may move the control member 109 rightwardly in the slot portion 105b to actuate valve 114b, and by the time the control member reaches the position indicated by the indicator 165b the air pressure built up in duct 151 and duct 170 will actuate the valve 155a so as to cause actuation of the sand reel clutch 24 so that the sand reel will then be rotated at a speed determined by the setting of the speed change transmission 30 and the engine speed. Thereafter further rightward movement in the slot portion 105b will supply pressure to the throttle actuating means 133 so as to increase the power delivery and/or speed of the engine 36. When stopping of the rotation of the sand reel is desired, the operator moves the control member 109 back toward neutral position Nb to first open the valve 114b, thereby releasing the pressure in the duct 151 and the parts fed thereby, and to then open valve 167 so that air pressure will be released from the duct 169 to relieve the pressure against the lower end of the piston P, Fig. 7, and permit the spring 96 to apply the sand reel brake. If additional braking effect is desired for the sand reel brake, the operator will move the control member 109 in the path represented by the slot portion 105c, thereby actuating the valve 168 so as to deliver air pressure through the duct 170 and the inlet 99, Fig. 7, to the upper portion of the cylinder 93 so that air pressure will be applied to the upper face of the piston P and provide a brake actuating force supplementing that of the spring 96.

The control member 108 is movable from a neutral position Nc in two opposite paths of movement defined by the slot 104. As shown in Fig. 2, air valves 175 and 176 are disposed on opposite sides of the control member 108 so that this control member 108 is moved from the neutral position Nc into the path represented by the portion 104a of the slot 104, valve 175 will be actuated, and when the control member 108 is moved from the neutral position Nc in the opposite direction into the path of movement represented by the portion 104b of the slot 104, the valve 176 will be actuated. The valves 175 and 176 are of the same type as the valve 112 and they are respectively connected through ducts 177 and 178 with the catheads 25 and 26, Figs. 1 and 2, so that the operator may connect the air actuated mechanism of either of these catheads with a source of air supply. The invention provides means for preventing movement of the control member 108 so that inadvertent actuation of either of the catheads 25 or 26 will be avoided. Guard members 179 and 180, having the appearance of covers, are hinged along the side of the slot portions 104a and 104b. In Fig. 4, the guard member 179 is shown swung back so as to uncover the slot portion 104a and the guard member 180 is shown in a position covering the slot portion 104b. At this time the control member 108 may be moved only in the path defined by the slot portion 104a and the guard member 180; permits movement of the control member 108 into the slot portion 104b, thereby preventing inadvertent movement of the control member 108 into the slot portion 104b, which would result in actuation of the cathead 26. When the operator desires to use the breakout cathead 26, he reverses the positions of the guards 179 and 180 from that shown, and during the times when no cathead service is required, both of the guards 179 and 180 will be swung into positions covering the respective slot portions 104a and 104b.

I claim:

1. In a drawworks arranged to be driven from a power delivery means, said drawworks having a drum: a speed change mechanism having input shaft means connected to said power delivery means so as to be driven thereby and first and second speed transmissions; a drum drive connection from said speed change mechanism to said drum, said connection having a clutch; a control for said power delivery means; a movable control member; means defining for said control member first and second paths of movement away from a neutral position and a third path of movement away from one of said other paths of movement; means responsive to movement of said control member in said first and second paths of movement to respectively actuate said first and second speed transmissions; means acting in response to movement of said control member in said third path of movement to actuate said clutch of said drum drive connection; and means acting in response to further movement of said control member to actuate said control for said power delivery means.

2. In a drawworks arranged to be driven from a power delivery means, said drawworks having a drum: a speed change mechanism comprising first and second rotatable members, a shaft, a sleeve surrounding said shaft and supported for rotation, transmission means connecting one of said rotatable members to said shaft and said sleeve so that they will be driven at different speeds, and first and second clutches operative to connect said shaft and said sleeve to the other of said rotatable members; means for connecting one of said rotatable members to said power delivery means; a drum drive connection from the other of said rotatable members to said drum, said connection having a clutch; a movable control member; means defining for said control member first and second paths of movement away from a neutral position and third path of movement away from the end of one of said other paths of movement; means responsive to movement of said control member in said first and second paths of movement to respectively actuate said first and second clutches of said speed change mechanism; and means acting in response to movement of said control member in said third path of movement to actuate said clutch of said drum drive connection.

3. In a drawworks arranged to be driven from a power delivery means, said drawworks having a drum: a speed change mechanism comprising first and second rotatable members, a shaft, a sleeve surrounding said shaft and supported for rotation, transmission means connecting one of said rotatable members to said shaft and said sleeve so that they will be driven at different speeds, and first and second fluid actuated clutches operative to connect said shaft and said sleeve to the other of said rotatable members; means for connecting one of said rotatable members to said power delivery means; a drum drive connection from the other of said rotatable members to said drum, said connection having a fluid actuated friction clutch; a movable control member; means defining for said control member first and second paths of movement away from a neutral position and a third path of movement away from one of said other paths of movement; means including valve means arranged to be operated in response to movement of said control member in said first and second paths of movement to deliver fluid pressure respectively to said first and second fluid actuated clutches; and means including a valve opened in response to movement of said control member in said third path of movement to supply fluid pressure to said fluid actuated friction clutch of said drum drive connection.

4. In a drawworks arranged to be driven from a power delivery means, said drawworks having a drum: a speed change mechanism comprising first and second rotatable members, a shaft, a sleeve surrounding said shaft and supported for rotation, transmission means connecting one of said rotatable members to said shaft and said sleeve so that they will be driven at different speeds, and first and second fluid actuated clutches operative to connect said shaft and said sleeve to the other of said rotatable members; means for connecting one of said rotatable members to said power delivery means; a drum drive connection from the other of said rotatable members to said drum, said connection having a fluid actuated friction clutch; a fluid operated control for said power delivery means; a movable control member; means defining for said control member first and second paths of movement away from a neutral position and a third path of movement away from one of said other paths of movement; means including valve means arranged to be operated in response to movement of said control member in said first and second paths of movement to deliver fluid pressure respectively to said first and second fluid actuated clutches; means including a valve opened in response to movement of said control member in said third path of movement to supply fluid pressure to said fluid actuated friction clutch of said drum drive connection; and means having a valve arranged to operate in response to further movement of said control member to deliver fluid pressure to said control for said power delivery means.

5. In a drawworks arranged to be driven from a power delivery means, said drawworks having a drum and a sand reel: a speed change mechanism arranged to be driven by said power delivery means, said mechanism having a pair of fluid actuated clutches; a drum drive connection from said speed change mechanism to said drum, said drive connection having a fluid actuated clutch; a spring-applied brake for said sand reel; fluid operated means for disengaging said brake; a fluid operable normally disengaged brake means for said sand reel for supplementing the braking effect of said spring-applied brake; a sand reel drive connection from said speed change mechanism to said sand reel, said sand reel drive connection having a fluid operated clutch; a control member arranged to be moved in first and second paths extending away from a neutral position and in a third path extending away from the outer portion of said first path; means including valves operating in response to movement of said control member in said first, second and third paths to deliver fluid pressure respectively to said fluid operated means for disengaging said spring-applied brake, said fluid operable brake and said operated clutch of said sand reel drive connection; a second control member arranged for movement in first and second paths which extend away from a neutral position and a third path which extends away from the end portion of at least one of the other of said last named paths; and means including valves acting in response to movement of said last named control member in said last named paths to deliver fluid pressure respectively to said clutches of said speed change mechanism and said clutch of said drum drive connection.

6. A drawworks as defined in claim 5 having also a fluid operated control for said power delivery means, and means acting in response to further movement of said control members outside said third paths of movement to deliver fluid pressure to said fluid operated control.

(References on following page)

References Cited in the file of this patent

UNITED STATES PATENTS

| Number | Name | Date |
|---|---|---|
| 1,880,222 | Turney | Oct. 4, 1932 |
| 1,987,435 | Engel | Jan. 8, 1935 |
| 2,085,040 | Post | June 29, 1937 |
| 2,195,200 | Bloss | Mar. 26, 1940 |
| 2,276,224 | Cardwell | Mar. 10, 1942 |
| 2,308,299 | Page | Jan. 12, 1943 |
| 2,315,157 | Maier | Mar. 30, 1943 |
| 2,327,467 | Spalding | Aug. 24, 1943 |
| 2,344,681 | Deschner | Mar. 21, 1944 |
| 2,376,545 | Livermore | May 22, 1945 |
| 2,386,217 | Kegresse | Oct. 9, 1945 |
| 2,438,410 | May | Mar. 23, 1948 |
| 2,492,816 | Rosman | Dec. 27, 1949 |
| 2,505,260 | Stevens | Apr. 25, 1950 |
| 2,536,483 | Young | Jan. 2, 1951 |
| 2,576,872 | Young | Nov. 27, 1951 |
| 2,620,909 | Moon | Dec. 9, 1952 |